UNITED STATES PATENT OFFICE.

FRANCIS LAUR, OF PARIS, FRANCE, ASSIGNOR TO HARRISON BROTHERS & CO.

IMPROVEMENT IN THE MANUFACTURE OF ALUMINOUS CAKE.

Specification forming part of Letters Patent No. 220,720, dated October 21, 1879; application filed February 12, 1879.

*To all whom it may concern:*

Be it known that I, FRANCIS LAUR, of the city of Paris, in the Republic of France, have invented Improvements in the Manufacture of Aluminous Cake, of which the following is a full description, and sufficient to enable those skilled in the art to which my invention appertains to practice the same.

The object of this invention is to manufacture with aluminous earths, (containing more or less iron,) such as argil, kaolin, &c., and by preference with hydrates of alumina, known under the name of "bauxites," a sulphate of alumina completely deprived of its free acid, and exempt, or almost exempt, from iron in such form as to discolor the resulting product of alumina.

In ferruginous solutions of sulphate of alumina the iron usually exists in the form $Fe_2O_3$. This compound causes the sulphate of alumina to assume a colored appearance, which renders the latter substance unsuited to many purposes for which only white or bleached sulphate of alumina is useful.

I have discovered that an acid ferruginous solution of sulphate of alumina may be rendered both neutral and colorless or white without eliminating the iron by the introduction of metallic zinc to the same.

I find the following to be an advantageous method of practicing my invention: In a suitable vessel, say a lead-lined tank, a certain quantity of 50° Baumé sulphuric acid is introduced, say five hundred pounds, and heated to about 90° or 95° centigrade by a direct jet of steam. To this is added a quantity of finely-ground bauxite, which will vary according to the strength or percentage of alumina that such bauxite may contain, care being taken not to obtain a neutral solution, but to keep the sulphuric acid slightly in excess. Generally two hundred to two hundred and fifty pounds bauxite to five hundred pounds of 50° sulphuric acid will suffice. Soon after the bauxite has been introduced a violent action will begin, and water will have to be added in small quantities from time to time, so as to prevent an overflow. For this reason the tank will have to be of such size that the mixture of acid and bauxite will only have a volume of one-fifth of the capacity of the tank. After the contents of the tank has subsided to its original volume, water is added until the liquor will have a density of about 25° Baumé, after which it is drawn off into suitable vessels, when the silica and other insoluble particles will settle. In a few days the clear liquor, which will have a greenish tint, is drawn off into another vessel, and is here treated with metallic zinc.

Should accidentally a red color be produced in this liquor it will show at once that too much bauxite has been used, making the solution neutral. In this case a few pounds of acid is added, acidulating the solution, which at once will lose its red color. This metallic zinc, of which a sufficient quantity will have to be used, will at once be acted upon by the free sulphuric acid, and be transformed into sulphate of zinc, and thus neutralize it. At the same time all the iron present in the state of ($Fe_2O_3$) peroxide of iron will be reduced to the lower degree of oxidation, (FeO,) protoxide of iron, which, by its nature, forms salts of little or no color. The resultant alum cake when dry will be white. This solution is now boiled down to a proper density, say 46° to 50° Baumé, and run into cakes, which, after hardening, present a perfectly white appearance.

Having thus described my invention, what I claim, and desire to secure by Letters Patent of the United States, is—

An improvement in the process of manufacturing alumina cake, which consists in introducing zinc, or its equivalent, to an acidulated ferruginous solution of sulphate of alumina, to neutralize the free acid, and to convert the iron into a colorless compound of iron in the said solution prior to concentration.

In testimony whereof I have hereunto signed my name this 18th day of January, A. D. 1879.

F. LAUR.

In presence of—
F. SOLÉLÉNY,
WM. F. GRINNELL.